United States Patent [19]
Bucher

[11] Patent Number: 4,729,225
[45] Date of Patent: Mar. 8, 1988

[54] TURBO-CHARGED INTERNAL COMBUSTION ENGINE WITH EXHAUST GAS ENERGY RECUPERATION

[75] Inventor: Jakob Bucher, Bobingen, Fed. Rep. of Germany

[73] Assignee: M.A.N. - B&W Diesel GmbH, Augsburg, Fed. Rep. of Germany

[21] Appl. No.: 901,829

[22] Filed: Aug. 28, 1986

[30] Foreign Application Priority Data

Sep. 14, 1985 [DE] Fed. Rep. of Germany ....... 3532938

[51] Int. Cl.$^4$ .............................................. F02B 33/44
[52] U.S. Cl. ........................................ 60/608; 60/717; 60/718; 123/565
[58] Field of Search ................. 60/605, 607, 608, 698, 60/716, 717, 718; 123/565

[56] References Cited

U.S. PATENT DOCUMENTS

| | | | |
|---|---|---|---|
| 4,083,188 | 4/1978 | Kumm | 60/608 X |
| 4,622,817 | 11/1986 | Kobayashi | 60/608 |

FOREIGN PATENT DOCUMENTS

962764  6/1956  Fed. Rep. of Germany.

*Primary Examiner*—Stephen F. Husar
*Attorney, Agent, or Firm*—Frishauf, Holtz, Goodman & Woodward

[57] ABSTRACT

To efficiently recover excess energy available in a turbo supercharger (4) operated by exhaust gases from an internal combustion engine (ICE) (1), when the loading of the ICE exceeds about half of rated load, a hydraulic pump—motor unit (10) is coupled to the shaft of the turbo supercharger. The hydraulic unit (10) provides output over a hydraulic line (14) through a selectively operated valve (30) to either a hydraulic motor (15), which is coupled to an energy utilization system, for example a generator (17), or to return hydraulic fluid to a sump or suply (11). A controller (21) controls operation of the valve. If the exhaust gases are insufficient to provide excess energy for the hydraulic motor (15), the valve is controlled to return hydraulic fluid form said motor—pump unit so that, in effect, said unit (10) is idling. If the energy from the exhaust gases of the ICE is insufficient to provide necessary supercharged air, an auxiliary pump (27) driven by an electric motor (26) is operated to provide hydraulic pressure fluid to said unit (10), which will then operate as a motor, to drive the supercharging compressor shaft. The controller also selectively controls operation of the motor (26) driving the auxiliary pump (27) and operation of the valve (30) for selective supply of fluid from the unit (10) to the hydraulic motor (15) coupled to the energy utilization system or back to the supply (11).

20 Claims, 5 Drawing Figures

TURBO-CHARGED INTERNAL COMBUSTION ENGINE WITH EXHAUST GAS ENERGY RECUPERATION

Reference to related patent:
German Pat. No. 962 764.

The present invention relates to a turbo-charged internal combustion engine, in which an exhaust gas turbo is coupled to receive exhaust gases from the internal combustion engine (ICE), typically a Diesel engine, and in which the energy delivered by the turbine of the turbo charger may be in excess of that required to supercharge the engine, so that additional energy is available. The present invention is directed to usefully derving this excess energy.

BACKGROUND

Turbo superchargers, operated by the exhaust gases from an ICE, are well known. When applied to Diesel engines, and particularly to large Diesels, the energy in the exhaust gases may be in excess of that required to provide compressed supercharged air to the engine. German Pat. No. 962 764 is directed to a supercharged ICE in which excess energy is derived from the exhaust gases by coupling the exhaust gases to a separate auxiliary turbine, serially with the supercharging turbine, if the exhaust gases contain such excess energy. The coupling includes a gear drive train with a controlled clutch, which can be coupled to the engine drive shaft and thus provide additionally energy to the motor drive shaft, derived from the excess energy in the exhaust gases. It has been found that, particularly in large engines, the losses in this energy recuperation are high; the lines to the auxiliary engine are comparatively long and, if the auxiliary engine is located in the immediate vicinity of the supercharging engine, the drive train to the engine drive shaft requires a substantial number of rotary engine transmission elements which, again, renders the system complex. Particularly, however, the auxiliary turbine must be matched in its power output and speed to the exhaust gas turbine of the supercharger and, additionally, to the output of the primary or principal engine. It is, thus, necessary that, particularly in large engines, the energy recuperation involves undesirable compromise designs. The comprise must be made because the spatial relationship in a large-size ICE, typically a Diesel ICE, does not permit optimal contact arrangements of the auxiliary turbine and the supercharging turbine with respect to the main engine drive shaft. It is, therefore, extremely difficult to recuperate excess energy derived from the exhaust gases, and such energy recuperation as can be effected is converted into rotary energy only at very low efficiency.

THE INVENTION

It is an object to provide a turbine supercharged ICE in which excess exhaust gas energy can be readily converted into rotary energy, which conversion is also suitable for adaptation to large Diesel ICEs; and, as an additional object, the conversion system should permit use of the energy recuperation unit as a drive unit to provide auxiliary drive power to the ICE if the exhaust gases do not provide excess energy and the operating conditions of the ICE require external energy, for example under starting conditions, without requiring separate elements for engine recuperation and assistance to the operation of the engine.

Briefly, a hydraulic pump-motor unit is coupled to the supercharger turbine shaft. Such a unit can operate either as a hydraulic pump, if the shaft thereof is driven, or can operate as a hydraulic motor if hydraulic energy is provided thereto, to provide torque output at its shaft. Hydraulic fluid is supplied to the pump-motor unit. A hydraulic motor is coupled to a hydraulic line connected to the outlet of the hydraulic pump-motor unit, the hydraulic motor driving an energy utilization element, for example an electrical generator, another pressure fluid pump, or the like. In order to permit the hydraulic pump-motor unit to operate selectively as a pump or as a motor, a fluid control valve is connected in the line which extends from the pump-motor unit to the hydraulic motor for selectively, controllably directing hydraulic fluid from the pump-motor unit either to the hydraulic motor for excess energy recuperation, or to a sump. An auxiliary hydraulic pump, operated by an auxiliary motor, for example an electric motor, is provided, which can be selectively coupled to the inlet of the hydraulic pump-motor unit. A control unit controls, selectively, the operation of the motor and the auxiliary hydraulic pump, as well as the switching state of the valve, thereby permitting, selectively, operation of the hydraulic pump-motor unit to, hydraulically, drive the hydraulic motor if excess energy is present or, if additional energy is required, to control starting of the drive motor which is coupled to the pump, and thereby supplying pressurized hydraulic fluid to the pump-motor unit, which will then operate as a motor, the valve draining the outlet to a sump. The control unit can be responsive, selectively, to operating parameters of the internal combustion engine such as pressure of supercharged air, speed of the ICE and/or fuel supply to the ICE.

The system has the advantage that utilizable energy output can be obtained if the exhaust gases contain excess energy, easily and at any desired location, without interfering with the spatial layout of the ICE; and, additionally, if the ICE requires external energy, for example under starting conditions, the very same unit can be used to supply this additional energy.

DETAILED DESCRIPTION.

Figure 1:
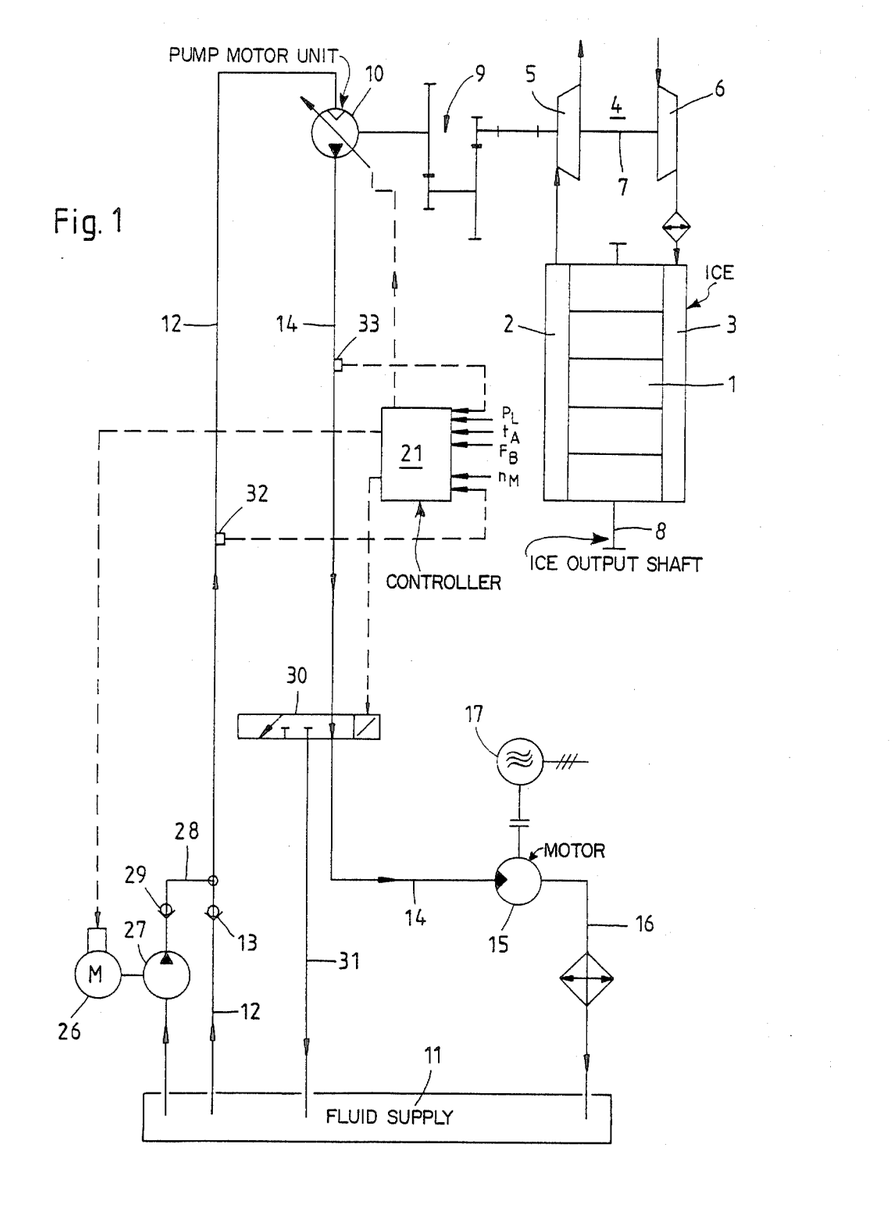
FIG. 1 is a schematic diagram illustrating the system, in which an ICE in form of a Diesel engine is shown schematically, and the coupling arrangement of the ICE to the energy recuperation - energy supply system.

An internal combustion engine (ICE), especially a large-size Diesel engine 1, which may be a two-stroke or a four-stroke engine, has an exhaust gas manifold 2 and an air inlet manifold 3. The air inlet manifold 3 is supercharged, that is, air being supplied to the inlet manifold 3 is pressurized. An exhaust gas turbosupercharger 4 is associated with ICE, having a turbine unit 5 and a compressor unit 6, both rotatably secured to rotate on a common shaft 7. The housing and other physical structures of the turbosupercharger 5 and the compressor 6 have been omitted from the drawing and may be in accordance with any well known suitable and standard construction. The exhaust gas turbine 5 is coupled to the exhaust manifold 2; the compressor turbine 6 is coupled to the inlet manifold 3. The ICE 1 provides output power at a drive shaft 8.

The exhaust gas turbosupercharger 4 has a very high efficiency. Under numerous operating conditions, the energy in the exhaust gases from the ICE 1 may well be in excess of that which is required to supercharge the ICE, that is, the compressor 6 would provide an excess of air over that which results in optimal fuel-air ratio, that is, optimal combustion conditions. This occurs particularly in the upper regions of loading of the ICE. The resulting excess exhaust gas energy can be converted into useful externally available energy, for example into mechanical drive energy, by a suitable energy recuperation system.

In accordance with the present invention, the energy recuperation system essentially includes a hydraulic pump-motor unit 10, coupled to the common drive shaft 7 by a suitable speed reduction gearing 9. The unit 10 is the type of pump-motor structure which, selectively, can operate either as a hydraulic pump, sucking hydraulic fluid at ambient pressure level from a supply or sump and providing pressurized hydraulic fluid at the outlet; or being operable as a motor, in which case the inlet is connected to a source of pressurized hydraulic fluid, and the outlet is connected to a sump or drain. Hydraulic pump-motor units, as such, are well known and any suitable hydraulic pump-motor unit may be used in the unit 10.

A sump or supply 11 provides hydraulic fluid, typically oil, from which the unit 10 can suck fluid through an inlet line 12. A check valve 13, permitting only suction, is included in the line 12. The outlet of the hydraulic unit 10 is connected to an outlet line 14 which, when unit 10 operates as a pump, provides pressurized hydraulic fluid sucked up from supply or sump 11 through line 12 over check valve 13 to a hydraulic motor 15. The now unpressurized hydraulic fluid or oil from pump 15 is returned to the sump 11 through a drain line 16.

The motor 15 can be coupled to any suitable energy supply unit; in FIG. 1, motor 15 is connected via a coupling to an electric alternator 17 which can be directly driven from the hydraulic motor 15. Hydraulic motors usually operate at high speed and alternators, likewise, can receive rotary input power at high speed.

Figure 2:
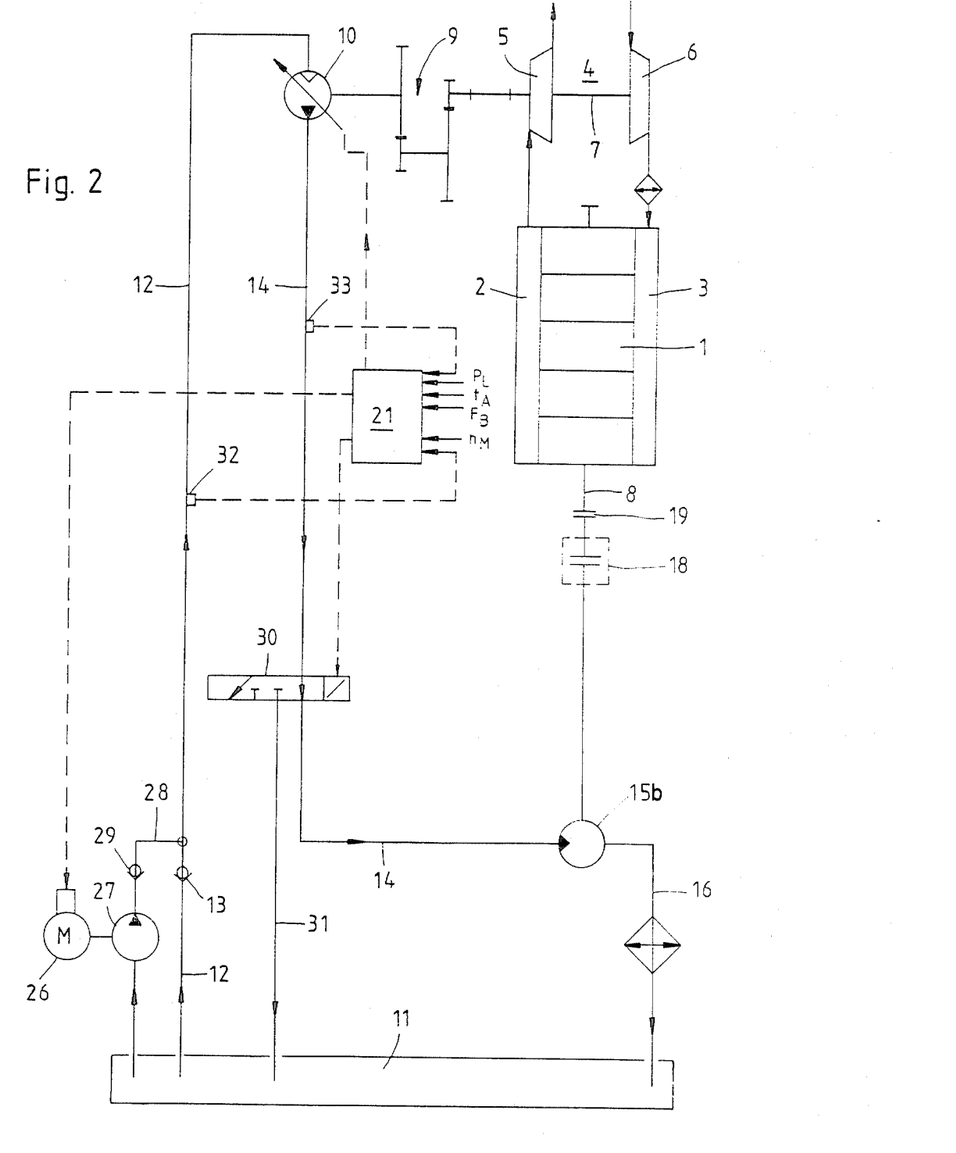
FIG. 2-5 are diagrams similar to FIG. 1 and illustrating other embodiments.

Embodiment of FIG. 2: The system described so far is identical to that of FIG. 1; the only difference is that the hydraulic motor 15b is constructed as a slow-speed motor which is coupled to a clutch 18, an elastic rotary oscillation damping coupling 19, and then to the shaft 8 of the ICE 1. The clutch 18, preferably, is an automatic overrunning clutch.

Figure 3:
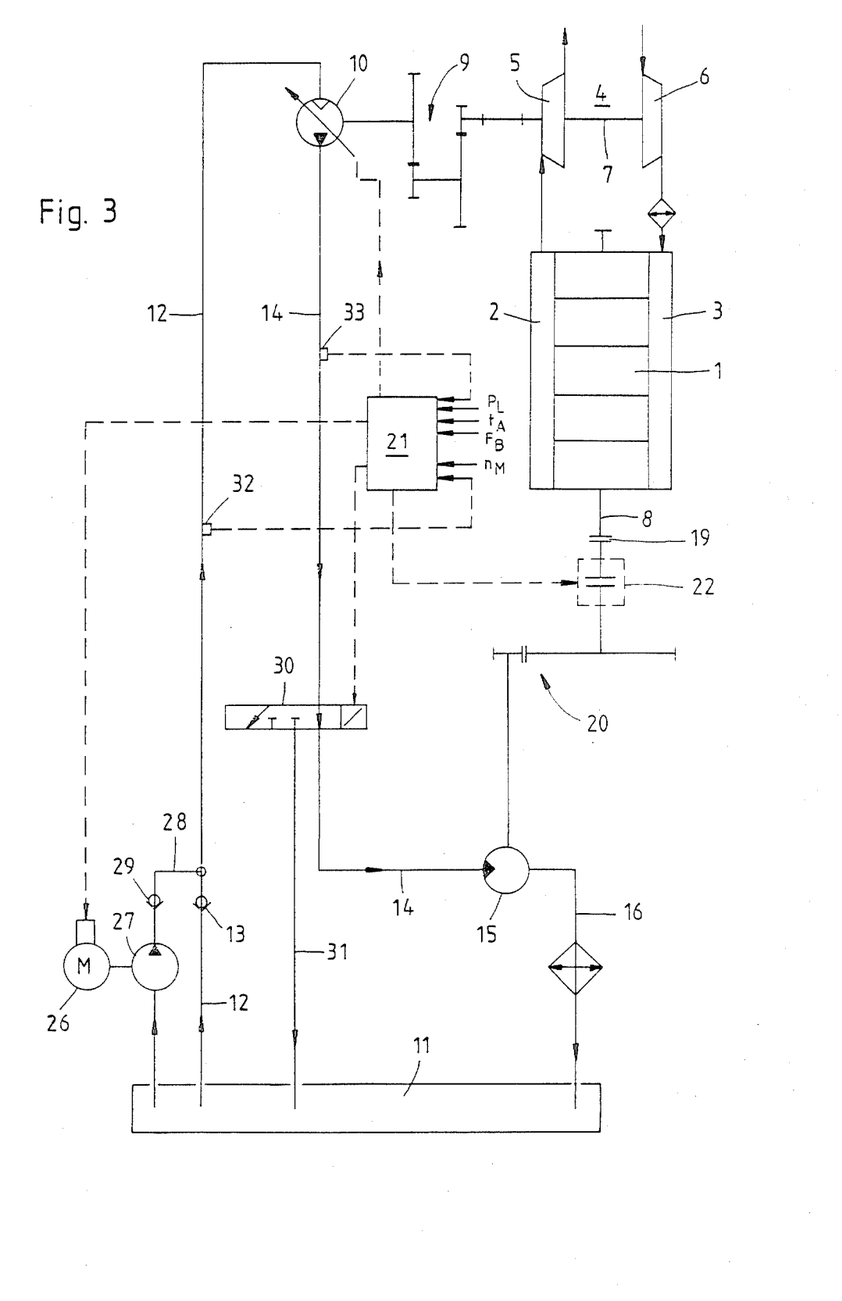

Embodiment of FIG. 3: The hydraulic motor 15, again, is of the high-speed type; the motor 15 is coupled to a reduction gearing 20, and the shaft of the reduction gearing is connected to a controlled clutch 22 which, at its output, is again coupled to an oscillation damping coupling 19 which, in turn, is connected to the drive shaft 8 of the ICE 1. Engagement and disengagement of the clutch 22 is controlled from a control system 21, which will be discussed in detail below. Alternatively, an overrunning clutch 18 may be placed in lieu of the controlled clutch 22.

Figure 4:
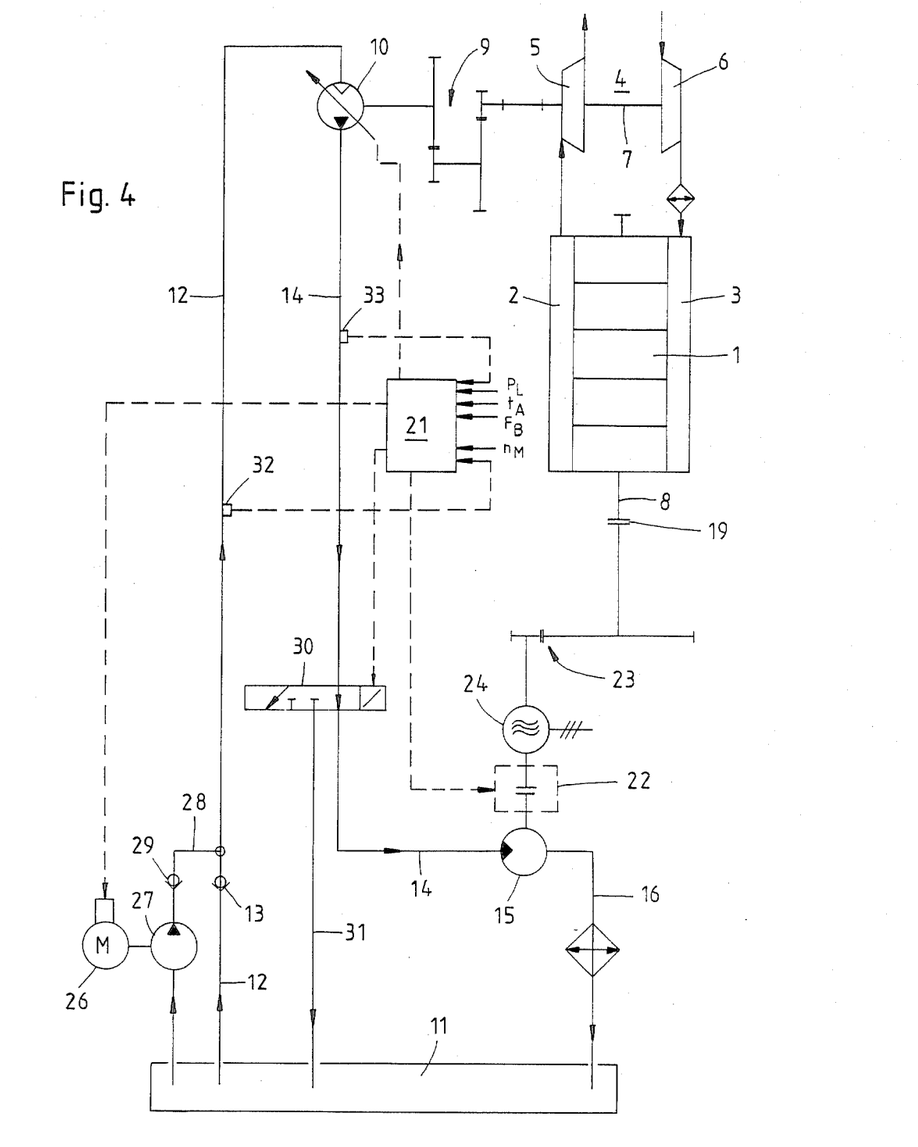

Embodiment of FIG. 4: The hydraulic motor 15 is connected through a controlled clutch 22 to an electric alternator or generator 24, as shown a three-phase alternator. The three-phase alternator can also be driven from the output shaft 8 of the ICE 1 through an oscillation damping coupling 19. The alternator 24 has a shaft which is not only coupled to the controlled clutch 22 but, also, to a gearing 23.

In dependence on the exhaust as energy derived from the ICE 1, the generator 24 is either driven from the output shaft of the ICE 1 or, if excess energy is available, driven from the hydraulic motor 15. If the energy derived from the hydraulic motor 15 and applied to the generator 24 is in excess of that required to drive the generator 24, the remaining energy is applied to the drive shaft 8 of the ICE 1. Thus, the power provided by the ICE to drive the alternator 24 is reduced if the exhaust gas energy is sufficient to drive the alternator 24 or still reduced further if excess energy is transferred through the gearing 23 to the output shaft 8 of the ICE. The operation of the clutch 22 is controlled by the control unit 21 which, essentially, may be similar to that shown in FIG. 3. The rotary oscillation damping coupling 19 should be included in all these systems in which the hydraulic motor 15 is coupled to the shaft 8 of the ICE. Preferably, it is always included.

Figure 5:
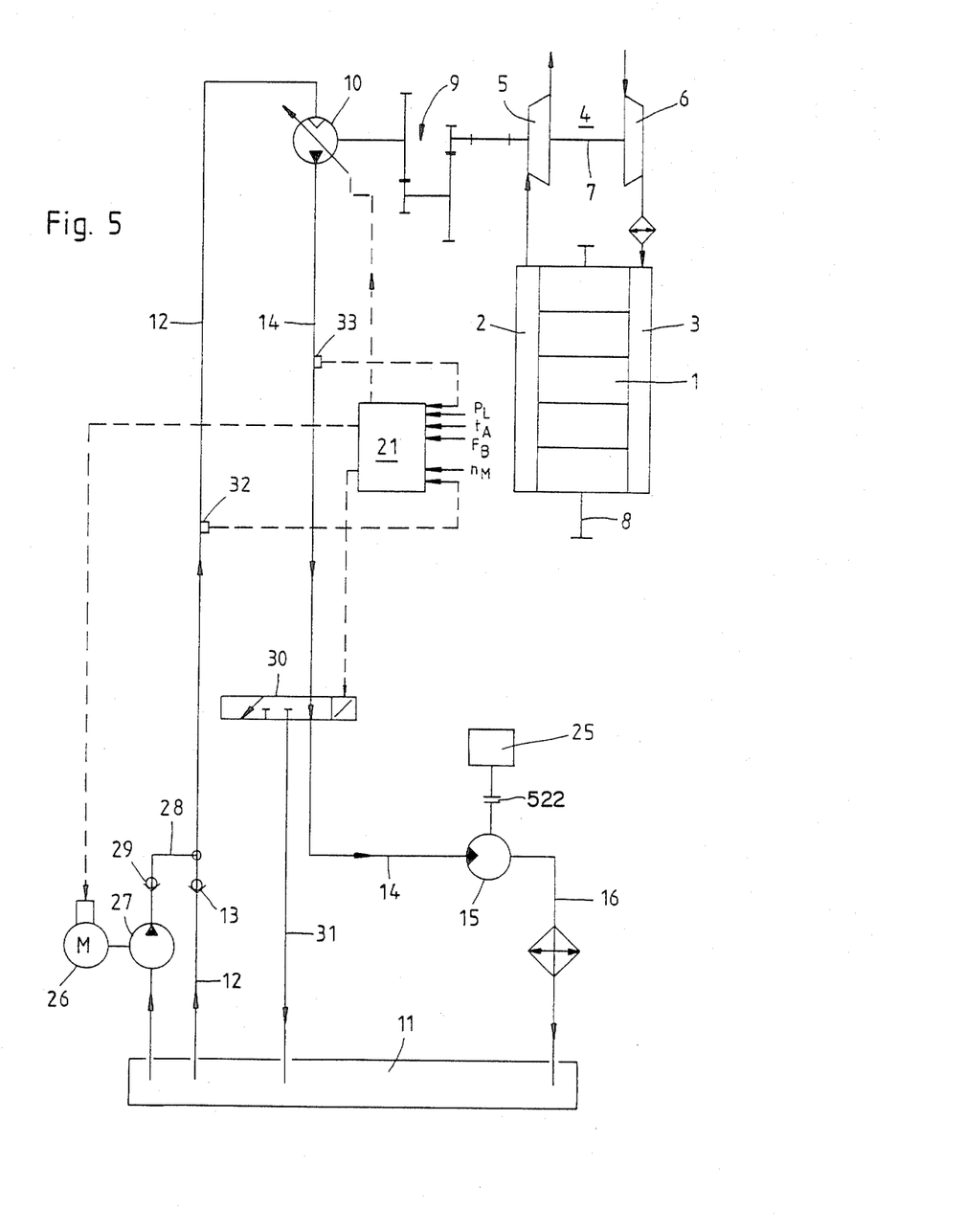

Embodiment of FIG. 5: The hydraulic motor 15 is coupled by a suitable coupling 522, which may include a reduction gearing, to a unit which is used in combination with or forms part of the ICE, or the machine system system driven by the ICE 1. Thus, unit 25 may be a hydraulic or air pump used to pump fluids utilized in a plant of which the ICE 1 forms a part; the unit 25 may be a compressor or the like. In dependence on the speed and power requirements of the unit 25, the coupling 522 may be a direct coupling, it may include an interposed gearing, and/or a torsion or rotation oscillation damping element.

In all cases shown and described in FIGS. 1–5, and independently of the type of energy absorber coupled to the pump 15, additional auxiliary energy can be derived from the pump 15 usually when the ICE 1 operates over about 50% of its nominal power output. When the loading on the ICE 1 exceeds about half of its nominal power output, the energy in the exhaust gases therefrom is usually in excess of that required to operate the turbosupercharger 4. As the power output of the ICE 1 rises and approaches rated power, the excess energy available from the exhaust gases also rises.

Referring again to FIG. 1: A control unit 21 is shown which, preferably, is an electronic control element such as an electronic microcomputer, coupled to suitable sensing inputs and having control output ports. The electrical connection lines to the controller 21 are shown in broken lines for ease of analysis of the drawing; thus, solid lines represent hydraulic or mechanical connections; broken lines electrical connections or signaling lines.

A plurality of suitable sensors or transducers or detectors are provided which signal actual operating values of the ICE to the unit 21. Such detectors or transducers are not shown in the drawing for simplicity, only their outputs, namely:

pressure of charged air $P_L$, for example derived from the inlet manifold 3 or the line coupling the turbosupercharger compressor 6 to the inlet manifold 3; and/or exhaust gas temperature $t_A$ derived, for example, from a temperature sensor coupled to the exhaust gas manifold 2; and/or operator controlled fuel supply, which also corresponds to the fuel/air mixture fill in the cylinders of the ICE, shown schematically by the arrow $F_B$. A signal of this type can be provided, for example, from a potentiometer coupled to an operator-controlled lever, pedal, or the like;

speed of the engine, $n_M$, derived for example from a tachometer; another parameter which can be applied to the controller 21 is the power rating of the unit 10.

The system so far described permits recuperation of excess exhaust gas energy and to obtain optimal utilization of this energy, either in the form of mechanical drive energy, electrical energy, or fluid energy, e.g. by operating a compressor and storing, for example, compressed fluid—see element 25, FIG. 5. The application of this recuperated energy is simple and can be applied, as selected and as desired, without excessive losses.

The system of the present invention not only permits recuperation of excess energy but, with only minimum extension of the system and addition of minimal components, also application of energy to the ICE 1. Under some operating conditions, and particularly if the ICE 1 is a two-stroke large Diesel engine, some operating phases or conditions occur in which the exhaust gas energy is insufficient, and, actually, energy should be supplied to the turbosupercharger 4 since the exhaust gas energy derived from the ICE 1 is insufficient to operate the turbosupercharger 4 to provide sufficient charging air. Upon starting, operation at low load, and under accelerating condition, the turbosupercharger 4 should be accelerated rapidly. Under some conditions, particularly under conditions of acceleration from a lower load range and loading in a higher load range, the energy recuperation system can also be used effectively in four-stroke large Diesel engines. The system, thus, is versatile and can be applied to all types of ICEs, but is especially suitable for large Diesel engines, of the two-stroke or four-stroke type. The additional components have been shown in all the drawings for simplicity.

The additional elements necessary to operate the turbosupercharger 4 so that it will supply compressed air via the compressor 6 to the inlet manifold 3, even under severe conditions, will become effective when the exhaust gas energy is insufficient to operate the turbosupercharger 4 efficiently. Under such conditions, the unit 10 is operated not as a pump, but rather as a hydraulic motor, supplied with pressurized oil. The pressurized oil is derived from an auxiliary pump 27, driven by an electric motor 26. Pump 27 sucks hydraulic fluid from the sump or supply 11, provides the fluid through a check valve 29 to a junction 28, coupled in the supply line 12 of the unit 10. The two check valves 13, 29 permit supply of pressurized fluid only in the upward (with respect to FIG. 1) direction; thus, fluid sucked by the unit 10, when operating as a pump, cannot flow into the pump 27 to operate it as a motor; and pressurized fluid derived by the pump 27 when it is driven from motor 6 cannot be drained to the sump 11. The junction 28, thus, is located above both of the check valves 13, 29 with respect to the unit 10.

The other additional element which is needed is a selectively controllable valve 30, which, effectively, is a switch-over valve, electrically operated and connected to the controller 21, to be controlled thereby. The valve 30 is interposed in the outlet line 14 from the unit 10.

Selective operation: When the unit 10 operates as a pump, pressure fluid is sucked through line 12, check valve 13, and applied, under pressure, from an outlet through the line 14 to the hydraulic motor 15, 15b, respectively. When operating as a hydraulic motor, electric motor 26 is energized, driving pump 27 which provides pressurized fluid through line 28 and the junction with line 12 to the unit 10, thus providing rotary energy to the gearing 9 and hence to the shaft 4 coupled not only to the exhaust gas turbine 5 but also to the compressor 6, thereby providing additional supercharged air to the inlet manifold 3 of the ICE 1. Fluid, now at effectively no pressure, is coupled from the outlet 14 of the unit 10 through the valve 30 which will switch over one line to the left (with respect to FIG. 1) so that unpressurized hydraulic fluid can now be returned to the sump or supply 11 through a drain line 31, coupled to valve 30.

The switch-over or transfer of the transfer valve 30 is controlled by the controller 21. Controller 21 also controls operation of the motor 26 and hence of the pump 27, based on operating parameters of the ICE 1, as above listed, and specifically based on pressure of charge air $P_L$, ICE speed $n_M$ and/or operator controlled fuel supply $F_B$.

Exhaust gas turbosuperchargers 4 have a very high efficiency. When the power output of the ICE exceeds approximately 50% of its nominal power, the excess energy available at the turbine 5 and derived solely from the exhaust gases may well be in the order of 5% and more of the energy supplied by the ICE 1.

Controller 21 controls operation of the unit 10, valve 30, motor 26 and, if provided, of clutch 22 (FIG. 3). The controller 21 receives sensing inputs from pressure sensors 32, 33, coupled to the inlet and outlet lines 12, 14, respectively, of the unit 10. The controller 21 also will be sensitive to power output commanded to be delivered by the ICE 1, for example based on fuel supply. When the ICE 1 is loaded to provide output power below approximately half of its nominal output rating, the pump 10 will not receive excess energy from the turbo supercharger 4; thus, controller 21 provides a control signal to the unit 10 controlling the unit 10 to "zero" throughput operation; the throughput of the unit 10, thus, will be a minimum value. The valve 30 is controlled to connect the outlet line 14 directly with the drain line 31, so that, under conditions of operation below about half of nominal power rating, the hydraulic pump 15 is not operated.

The ICE 1 may be a two-stroke large Diesel engine. Under such conditions, the auxiliary pump 27, driven by the electric motor 26, may be very useful not only to operate the ICE 1 under conditions in which excess charging air is required—for example acceleration, and other conditions under which exhaust gas energy from the exhaust gas manifold 2 is insufficient to provide supercharged air by the supercharger 4—but, further, as an assistance upon starting. Two-stroke Diesel engines require different starting assistance than four-stroke Diesel engines.

Large Diesel engine starting: Upon starting of a two-stroke large Diesel engine, a sequence of steps are programmed, to utilize the system of the present invention to best advantage, as follows:

First, the controller 21 provides the command to the motor 26 to start pump 27 which, then, will provide a pressurized oil flow to the unit 10, now operating as a motor. The valve 30 is in the position in which the outlet line 14 is coupled to the drain 31. The pump 15 is disconnected from the system at the valve 30. Pressurized oil or other hydraulic pressure fluid, supplied by the pump 27, is now passed through the unit 10.

To operate unit 10 as a motor, the oil drained therefrom is returned directly to the supply or sump 11. The control unit 21 senses the pressure in line 12 by the connections from pressure sensor 32 to the controller 21. The supply volume of the pump 27, supplying pressurized operating fluid to the unit 10, is controlled in dependence on the pressure sensed by the sensor 32, so that an appropriate pressure in line 12 is not exceeded. The appropriate pressure will depend on the design of the pump-motor unit 12 and the supply pressure, including pressure settings of the auxiliary pump 27. The respective settings can be programmed into the controller 21 or set therein by a suitable setting—for example by a potentiometer—so that, upon a comparison of maximum permitted pressure and actual pressure as sensed by sensor 32, the motor 26 is controlled to operate the auxiliary pump 27 so that nominal maximum pressure is not exceeded. The value for the pressure in the suction line 12, in combination with the output of the auxiliary pump 27 is so set that the necessary power output of the hydraulic unit 10, necessary to supply air to the ICE 1 under starting conditions, will be supplied by the compressor unit 6 of the turbosupercharger, driven by the unit 10.

As soon as the turbosupercharger 4, driven in this phase from the unit 10, has reached a predetermined speed, suitable and necessary to provide the required supercharged air by compressor 6 to the inlet manifold 3, the ICE 1 can be started by a compressed air starter, as is customary with large Diesel engines, by injecting compressed air into the combustion chamber of the cylinder.

If the ICE 1 is a four-stroke large-size Diesel engine, the previously described auxiliary starting requirement by operating the turbosupercharger 4 is not necessary, since a four-stroke Diesel ICE can be started without a previously present pressure differential between the pressure in the inlet manifold 3 and the outlet manifold 2.

Continuous ICE operation: If the ICE 1 is a two-stroke-large Diesel engine, the auxiliary drive to the unit 10 is preferably maintained until the ICE 1 operates at about 40% of nominal power. At lower loading, the exhaust gas is low and relatively less energy is available therefrom. Upon acceleration of the ICE 1, and particularly upon rapid acceleration, higher speeds from the turbosupercharger 4 are required than those which can be generated merely from the exhaust gas energy of the ICE itself. The auxiliary energy provided by the unit 10, through the auxiliary pump 27, supplies the additional energy.

As the power output of the ICE 1 increases, the speed of operation of the turbosupercharger 4 will also increase. Consequently, it is no longer necessary to supply full power from the unit 10 and the power output of the unit 10 is gradually decreased. The pressure in the inlet line 12 to the unit 10 then—via controller 21—so controls the unit 10 that a predetermined pressure, for example stored in a memory in the controller 21, is maintained at a constant value. The sensor 32, sensing the actual pressure in the line 12, provides an actual pressure signal which is compared in the usual comparator, present in microprocessors, with a set or stored value, in which the set or stored value will depend on loading of the engine—for example as determined by signal $F_B$—temperature, speed, and the like. Upon difference between actual and commanded value, the operation of unit 10 is changed to null any differences.

Upon further loading of the ICE 1, and, when the load reaches and then exceeds approximately half of nominal power, the controller 21 provides an output signal to motor 26 to stop the motor; no additional pressure fluid will thus be provided to the unit 10; the drain line 31, however, remains connected, and the unit 10 will operate, essentially, under idle conditions. As the loading on the engine further increases, for example exceeding 50% of nominal power—or, as stored for example in electronic tables in the controller 21—valve 30 is switched over to the full-line position shown in FIG. 1, so that the unit 10 can now operate as a pump and provide useful output power. The switch-over to provide useful power from the turbosupercharger will be based on, essentially, charge air pressure $P_L$ and/or speed $n_M$ of the ICE 1, communicated to the controller 21. Oil, now sucked up by the unit 10, is supplied under pressure to the hydraulic motor 15. After the hydraulic motor 15 has run up to speed, clutch 22—if present (see FIGS. 3, 4)—is connected or engaged by a command signal from controller 21, for example by energizing a solenoid which engages a clutch coupling. If an automatically operating overrunning clutch 18 is used, the hydraulic motor 15, when it has run up and reaches a speed which is equal or exceeds that of the ICE 1, will provide energy to the shaft 8 of the ICE. Independently thereof, the supply volume of the hydraulic pump 10 is so controlled that the pressure in line 14, as sensed by a pressure sensor 33 coupled thereto, and applying its signals to controller 21, will remain within predetermined pressures set, for example, into a table in controller 21. The table associates, as before, charge air pressure $C_L$ and/or exhaust gas temperature $t_A$ and/or fuel supply command $F_B$. Controllers usually include therein read-only memories (ROMs) which can readily store operating condition tables. Such systems are well known in connection with Otto-type ICEs, particularly for automotive use. The pressure in line 14 is preferably so set that, as soon as the power output of the ICE exceeds approximately half of the nominal rating thereof, excess energy derived from the exhaust gas turbine 5 is taken up by the unit 10 and this so taken up energy is supplied to the hydraulic motor 15 and, via the motor 15, to the respective utilization element which may be an electrical generator 17 (FIG. 1), the drive shaft 8 of the ICE 1 (FIGS. 2 and 3), the drive shaft 8 of the ICE 1 and a generator 24 (FIG. 4), or any other energy utilization or consuming element 25 (FIG. 5), e.g. a compressore, water, or other pump.

Upon reduction in output power of the ICE 1, the control course previously described is reversed; for example, if the ICE 1 had been operating at full power and is charged to fractional power below half, controller 21 will sense this decrease in power and connect the valve 30 to switch the line 14 over to line 31 and, upon further drop in power, and if required, cause starting of the electric motor 26 and auxiliary pump 27 so that unit 10 will provide additional rotary energy to the turbo supercharger 4 to maintain sufficient charge pressure in the inlet manifold 3.

Various changes and modifications may be made within the scope of the inventive concept. In the specification and drawings, valves and all other control elements usually used in hydraulic systems, and customary in the field and forming merely good engineering design have been omitted and may be used in accordance with well known industrial practice.

A "large Diesel ICE", for example is a Diesel for electric power generation, ship propulsion, or the like, typically in excess of 3,000 HP.

The excess exhaust gas energy rises with the size of the ICE. The cost of additional apparatus becomes relatively smaller with respect to overall cost, as the size of the ICE increases. With relatively large ICEs the economics of energy recuperation are favorable.

What is claimed:

1. Supercharged internal combustion engine (ICE) (1) having an exhaust gas turbosupercharger (4), said exhaust gas turbosupercharger having a supercharger shaft (7),
   a turbine (5) coupled to receive exhaust gases from the ICE (1) and a compressor part (6) providing supercharged air to the ICE, and
   an energy recuperation system coupled to said supercharger shaft to provide utilizable energy output upon excess energy being supplied to the supercharger by the exhaust gases coupled thereto, and to provide auxiliary energy to the supercharger shaft when the exhaust gases from the ICE are insufficient to provide energy to rotate said supercharger shaft (7) to provide supercharged air to the ICE,
   wherein
   the energy recuperation and auxiliary energy supply system comprises
   a hydraulic pump-motor unit (10) coupled to said supercharger shaft (7);
   means (11, 26, 27, 29, 28, 12, 13) coupled to an inlet of the hydraulic pump-motor unit (10) to supply pressurized hydraulic fluid to said unit including an auxiliary hydraulic pump (27) and motor means (26) driving said pump;
   a hydraulic connection line (14) hydraulically coupled to an outlet of said unit (10);
   a hydraulic motor (15);
   energy utilization means (8, 17, 24, 25) coupled to the hydraulic motor to accept energy therefrom;
   a hydraulic fluid control valve (30) connected in said hydraulic connection line and controllably, selectively directing hydraulic fluid from said unit (10) to the hydraulic motor (15) or to a hydraulic fluid supply or sump (11); and
   a control unit (21) coupled to control, selectively, operation of said motor means (26) and hence said hydraulic pump (27);
   further coupled to and controlling the operation of the hydraulic pump-motor unit (10); and
   further coupled to and controlling, selectively, operation of said fluid control valve (30), to control flow of hydraulic fluid to said hydraulic pump-motor unit (10) and, selectively, from said unit (10) to the hydraulic motor (15) or the supply or sump (11),
   said comtrol unit receiving inputs responsive to operating parameters of the ICE comprising pressure of hydraulic fluid flowing to or from said unit (10) and at least one of:
   pressure of supercharged air ($P_L$);
   speed of the ICE ($n_M$);
   fuel supply ($F_B$) to permit
   under acceleration conditions of the ICE, and when the exhaust gases have insufficient energy, providing additional super-charged air to the ICE by supplying pressurized hydraulic fluid to said hydraulic pump-motor unit (10),
   whereby additional rotary energy is supplied to said super-charger shaft (7) for supplying said additional supercharged air to the ICE.

2. The engine of claim 1, wherein said control unit comprises an electronic computer-type controller.

3. The engine of claim 2, wherein said electronic computer-type controller comprises a microprocessor.

4. The engine of claim 1, wherein said hydraulic motor (15) is a high-speed motor;
   and mechanical coupling means coupling with high-speed motor to said utilization means.

5. The engine of claim 4, wherein said mechanical coupling means comprises a reduction gearing (20).

6. The engine of claim 1, further including mechanical coupling means coupling the hydraulic motor (15) to said energy utilization means;
   wherein said energy utilization means comprises the output shaft (8) of the ICE, and the mechanical coupling means comprises a controlled clutch (22) interposed between an output from the hydraulic motor and said output shaft (8) of the ICE.

7. The engine of claim 1, including a mechanical coupling means coupling the hydraulic motor (15) to said energy utilization means;
   wherein said energy utilization means comprises the output shaft (8) of the ICE (1), and the mechanical coupling means comprises an overrunning clutch (8) coupling an output shaft of the hydraulic motor (15) to the shaft/of the ICE (1).

8. The engine of claim 1, including mechanical coupling means coupling the hydraulic motor (15) to said energy utilization means;
   and wherein the mechanical coupling means comprises a rotary oscillation or torque oscillation damping element (19).

9. The engine of claim 6, wherein said mechanical coupling means further includes a rotary oscillation or torque variation damping element (19).

10. The engine of claim 7, wherein said mechanical coupling means further includes a rotary oscillation or torque variation damping means.

11. The engine of claim 1, wherein said hydraulic motor (15) is a slow-speed motor;
    and wherein a mechanical coupling means is provided, directly coupling the hydraulic motor (15) to the energy utilization means.

12. The engine of claim 1, wherein (FIG. 4) the energy utilization means comprises an electric generator (24);
    drive means coupling the output shaft (8) of the ICE to a shaft of said generator (24);
    and further including mechanical coupling means including a clutch (18, 22) coupling the hydraulic motor (15) to the shaft of the generator to provide electrical power from the generator
    (a) upon lack of energy from the exhaust gases of the ICE to operate said unit as a pump, from the output shaft (8) of the ICE;
    (b) upon excess energy being available from the exhaust gases of the ICE, operating said unit as a pump to provide rotary power to said generator; and
    (b') upon operation under condition (b) and the electrical loading of the generator being less than the energy supplied by said hydraulic motor (15), transfer of output power to the shaft (8) of the ICE being effected via the shaft of the generator.

13. The engine of claim 12, wherein said mechanical coupling means further includes a rotary oscillation or torque variation damping element (19).

14. The engine of claim 1, wherein said energy utilization means comprises a generator (17) mechanically coupled to and driven from said hydraulic motor (15).

15. The engine of claim 1, wherein said energy utilization means (25) comprises an auxiliary compressor or pump, coupled to and driven from said hydraulic motor (15).

16. The engine of claim 15, wherein said auxiliary compressor or pump comprises a water pump.

17. The engine of claim 15, including a direct mechanical coupling between the hydraulic motor (15) and said compressor or pump.

18. The engine of claim 15, including a mechanical coupling comprising a speed change transmission between said hydraulic motor and said compressor or pump.

19. The engine of claim 1, further including at least one pressure sensing transducer (32, 33) located in at least one of the hydraulic lines (12, 14) coupled to said hydraulic pump-motor unit (10), said transducer providing output signals which are coupled to and, selectively, control operation of said control unit (21).

20. The engine of claim 19, wherein said control unit includes storage capability, storing operating characteristics of said ICE;

and said control unit, selectively, controls operation of said motor means (27) and hence said auxiliary hydraulic pump (27), as well as said fluid control valve (30), selectively, as a function of the relationship of stored operating characteristics of the ICE in the control unit (21) with respect to measured pressures, as signaled to said control sensing unit by said pressure transducers.

* * * * *